(12) United States Patent
Moon et al.

(10) Patent No.: US 12,735,604 B2
(45) Date of Patent: Sep. 15, 2026

(54) POLYDOPAMINE COMPOSITE MATERIAL AND MANUFACTURING METHOD THEREOF

(71) Applicant: KOREA INSTITUTE OF SCIENCE AND TECHNOLOGY, Seoul (KR)

(72) Inventors: Myoung-Woon Moon, Seoul (KR); Seong Jin Kim, Seoul (KR); Young A Lee, Seoul (KR); Chan Young Oh, Seoul (KR); Sang-jin Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 175 days.

(21) Appl. No.: 18/627,147

(22) Filed: Apr. 4, 2024

(65) Prior Publication Data

US 2025/0051608 A1 Feb. 13, 2025

(30) Foreign Application Priority Data

Aug. 8, 2023 (KR) ........................ 10-2023-0103729

(51) Int. Cl.

| | |
|---|---|
| ***C09D 179/04*** | (2006.01) |
| ***B05D 3/14*** | (2006.01) |
| ***B05D 5/00*** | (2006.01) |
| ***B29C 59/14*** | (2006.01) |
| ***B32B 3/30*** | (2006.01) |

(52) U.S. Cl.
CPC .................................. *C09D 179/04* (2013.01)

(58) Field of Classification Search
CPC ... C09D 179/04; B32B 3/30; B32B 2307/728; B29C 59/14
See application file for complete search history.

(56) References Cited

U.S. PATENT DOCUMENTS

| | | | | |
|---|---|---|---|---|
| 8,951,428 | B2 | 2/2015 | Gogolides et al. | |
| 10,134,566 | B2 * | 11/2018 | David | H01J 37/32009 |
| 12,049,052 | B2 | 7/2024 | Moon et al. | |
| 2010/0059433 | A1 * | 3/2010 | Freeman | B01D 67/0093 427/244 |
| 2014/0272291 | A1 | 9/2014 | Moon et al. | |
| 2020/0316881 | A1 | 10/2020 | Moon et al. | |

FOREIGN PATENT DOCUMENTS

| | | | |
|---|---|---|---|
| CN | 114989496 | A | 9/2022 |
| CN | 115475526 | A | 12/2022 |
| KR | 10-2013-0134080 | A | 12/2013 |

(Continued)

OTHER PUBLICATIONS

Haeshin Lee et al., "Mussel-inspired surface chemistry for multi-functional coatings," Science, 2007, pp. 426-430, vol. 318, DOI: 10.1126/science.1147241.

(Continued)

*Primary Examiner* — Joanna Pleszczynska

(57) ABSTRACT

Provided is a polydopamine composite material according to the concept of the present invention, wherein the polydopamine composite material includes a substrate with first nano-protrusions formed on a surface thereof, and a polydopamine layer on the surface of the substrate. The polydopamine layer includes second nano-protrusions protruding in a direction perpendicular to the surface of the substrate.

20 Claims, 13 Drawing Sheets

(56) References Cited

FOREIGN PATENT DOCUMENTS

| | | | |
|---|---|---|---|
| KR | 10-2014-0112848 | A | 9/2014 |
| KR | 10-2018-0117855 | A | 10/2018 |
| KR | 10-2020-0118942 | A | 10/2020 |
| KR | 10-2187858 | B1 | 12/2020 |

OTHER PUBLICATIONS

Yanlan Liu et al., “Polydopamine and Its Derivative Materials: Synthesis and Promising Applications in Energy, Environmental, and Biomedical Fields,” Chem. Rev., 2014, pp. 5057-5115, vol. 114.
Wenbo Sheng et al., “Brushing up from “anywhere” under sunlight: a universal surface-initiated polymerization from polydopamine-coated surfaces,” Chemical science, 2015, pp. 2068-2073, vol. 6.
Bruce P. Lee et al., “Mussel-Inspired Adhesives and Coatings,” Annual review of materials research, 2011, pp. 99-132, vol. 41.
Anita Kusuma Wardani et al., “Hydrophilic modification of polypropylene ultrafiltration membrane by air-assisted polydopamine coating,” Polymers for Advanced Technologies, 2019, pp. 1148-1155, vol. 30.
Zhen-Yu Xi et al., “A facile method of surface modification for hydrophobic polymer membranes based on the adhesive behavior of poly(DOPA) and poly(dopamine),” Journal of Membrane Science, 2009, pp. 244-253, vol. 327.
Fangfei Liu et al., “Mussel-inspired chemistry: A promising strategy for natural polysaccharides in biomedical applications,” Progress in Polymer Science, 2021, vol. 123.
Qiang Huang et al., “Polydopamine-based functional materials and their applications in energy, environmental, and catalytic fields: State-of-the-art review,” Chemical Engineering Journal, 2020, vol. 387.
Abdurrahman Telli et al., “The use of mussel-inspired polydopamine interlayer for high-efficiency surface functionalization of PET fabrics,” J. Polymer Research, 2022, vol. 29: 128.
Wei Yang et al., “Stability of Polydopamine Coatings on Gold Substrates Inspected by Surface Plasmon Resonance Imaging,” Langmuir, 2018, pp. 3565-3571, vol. 34.
Chao Zhang et al., “CuSO4/H2O2-Induced Rapid Deposition of Polydopamine Coatings with High Uniformity and Enhanced Stability,” Angewandte Chemie International Edition, 2016, pp. 3054-3057, vol. 55.
Chanyoung Oh et al., “Nanostructured surface with dopamine nanocoating for robust hydrophilicity,” KSME Annual Meeting 2022, 2022, KSME 22MF We01P16.

* cited by examiner

100S
NS1
100
400
200
210
NS1
NS2
300
400
100

Water Spreading at t+1 sec

Comparative Example 2

Water Spreading at t+1 sec

Comparative Example 3

Water Spreading at t+1 sec

Example 1

POLYDOPAMINE COMPOSITE MATERIAL AND MANUFACTURING METHOD THEREOF

CROSS-REFERENCE TO RELATED APPLICATIONS

This U.S. non-provisional patent application claims priority under 35 U.S.C. § 119 of Korean Patent Application No. 10-2023-0103729, filed on Aug. 8, 2023, the entire contents of which are hereby incorporated by reference.

BACKGROUND

The present disclosure herein relates to a polydopamine composite material and a manufacturing method thereof.

Polydopamine (PDA) is a polymer form of dopamine, and has excellent adhesion, hydrophilicity, and chemical stability. As a result, polydopamine may be easily coated on various materials, and thus, is used in various fields such as the biomedical field, energy storage devices, and the like.

For example, in the biomedical field, the use and research of polydopamine in cell culture and drug delivery systems are being conducted. The hydrophilicity and biological activity of polydopamine may promote adhesion and proliferation of cells.

CITATION LIST

Non-Patent Document

1. Mussel-inspired surface chemistry for multifunctional coatings H Lee, SM Dellatore, WM Miller, PB Messersmith, SCIENCE, 2007, 318, pp. 426-430, DOI: 10.1126/science.1147241
2. Yanlan Liu, K. A., Lehui Lu, Polydopamine and Its Derivative Materials: Synthesis and Promising Applications in Energy, Environmental, and Biomedical Fields. Chem. Rev., 2014. 114: p. 5057-5115

SUMMARY

The present disclosure provides a polydopamine composite material having superhydrophilicity, wherein the superhydrophilicity is continuously maintained.

An embodiment of the inventive concept provides a polydopamine composite material including a substrate with first nano-protrusions formed on a surface thereof, and a polydopamine layer on the surface of the substrate, wherein the polydopamine layer includes second nano-protrusions protruding in a direction perpendicular to the surface of the substrate.

According to some embodiments, the substrate may include at least one of plastic, silicon (Si), a metal, ceramic, a synthetic fiber, or a natural fiber.

According to some embodiments, the surface of the substrate may have any one shape among a planar shape, a curved shape, or a three-dimensional structure shape.

According to some embodiments, the first nano-protrusions may have the shape of a nano-pillar, a nano-hair, a nano-fiber, or a combination thereof.

According to some embodiments, a height of each of the first nano-protrusions may be approximately 50 nm to approximately 2.2 m, and a pitch between the first nano-protrusions may be approximately 10 nm to approximately 1.2 m.

According to some embodiments, a height of each of the second nano-protrusions may be approximately 30 nm to approximately 1.5 m, and a pitch between the second nano-protrusions may be approximately 10 nm to approximately 1.2 m.

According to some embodiments, the polydopamine composite material may further include functional particles disposed in the polydopamine layer, wherein the functional particles may include at least one of carbon black, carbon nanotubes, graphene, graphene oxide, metal-organic frameworks, metal particles, or oxide particles.

According to some embodiments, a thickness of the polydopamine layer may be greater than approximately 1 nm to less than approximately 10 m.

In an embodiment of the inventive concept, a method for manufacturing a polydopamine composite material includes preparing a substrate, forming nano-protrusions on a surface of the substrate, coating a dopamine solution on the surface of the substrate on which the nano-protrusions are formed, and polymerizing the dopamine solution in the air.

According to some embodiments, the forming of the nano-protrusions may include performing plasma treatment, wherein the performing of the plasma treatment may include providing $O_2$, $CF_4$, $SF_6$, Ar, $N_2$, $H_2$, and a mixture gas thereof on the surface of the substrate.

According to some embodiments, the performing of the plasma treatment may include performing a reaction between plasma and the surface of the substrate within approximately 1 to approximately 90 minutes.

According to some embodiments, the coating of the dopamine solution may be performed within approximately 1 second to approximately 1 minute.

According to some embodiments, the forming of the nano-protrusions may include a laser beam, ion beam, lithography, or acid etching process.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

In order to facilitate sufficient understanding of the configuration and effects of the inventive concept, preferred embodiments of the inventive concept will be described with reference to the accompanying drawings. However, the inventive concept is not limited to the embodiments set forth below, and may be embodied in various forms and modified in many alternate forms. Rather, these embodiments are provided so that this disclosure will be thorough and complete, and will fully convey the scope of the present invention to those skilled in the art to which the present invention pertains. In the accompanying drawings, elements are illustrated enlarged from the actual size thereof for convenience of description, and the ratio of each element may be exaggerated or reduced.

Unless otherwise defined, terms used in the embodiments of the inventive concept may be interpreted as meanings commonly known to those skilled in the art. Hereinafter, embodiments of the inventive concept will be described with reference to the accompanying drawings to describe the inventive concept in detail.

FIG. 1A, FIG. 1B, FIG. 1C, and FIG. 1D are conceptual views showing a process of forming a polydopamine composite material according to the inventive concept.

Figure 1A:
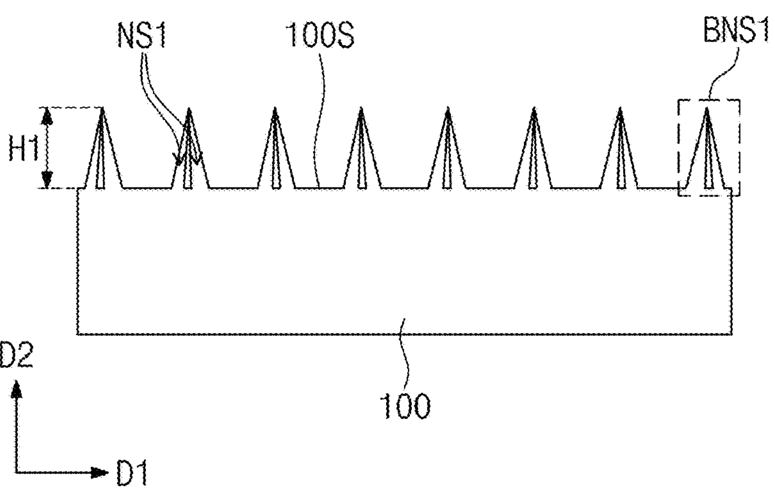
FIG. 1A, FIG. 1B, FIG. 1C, and FIG. 1D are conceptual views showing a process of forming a polydopamine composite material according to the inventive concept.

Referring to FIG. 1A, a surface 100S of a substrate 100 may be subjected to plasma treatment to form first nano-protrusions NS1. The substrate 100 may be a substrate which has a planar-shaped surface and which is made of plastic (polymer), silicon (Si), metal, ceramic, a synthetic fiber layer in the form of a fiber with a three-dimensional structure, or a natural fiber. The surface 100S of the substrate 100 may have any one shape among a planar shape, a curved shape, or a three-dimensional structure shape. For example, the substrate 100 may contain polyethyleneterephthalate (PET).

The plasma treatment may use a gas capable of etching the substrate 100. A gas for etching a substrate may be $O_2$, $CF_4$, $SF_6$, Ar, $N_2$, $H_2$, or a mixture gas thereof. For example, the plasma treatment may be oxygen plasma treatment using an oxygen ($O_2$) gas. The plasma treatment may include forming a vacuum state, injecting an oxygen gas, generating a plasma, reacting the plasma and the surface 100S of the substrate 100. The reacting of the plasma with the surface 100S of the substrate 100 may be performed within approximately 1 minute to approximately 90 minutes. The plasma treatment duration may vary depending on the type of a substrate and the conditions of plasma treatment. However, the plasma treatment is required to be performed for a predetermined period of time to form each of the first nano-protrusions NS1 with a greater height, and to increase the aspect ratio of the first nano-protrusions NS1. Therefore, suitably, it may be preferable that the plasma treatment is performed within approximately 5 minutes to approximately 60 minutes. More suitably, it may be preferable that the plasma treatment is performed within about 30 minutes. According to some embodiments, instead of the plasma treatment, a laser beam, ion beam, lithography, or etching process may be performed.

The first nano-protrusions NS1 may be arranged along a first direction D1 parallel to the surface 100S of the substrate 100. The first nano-protrusions NS1 may protrude in a second direction D2 perpendicular to the surface 100S of the substrate 100. At least some of the first nano-protrusions NS1 may form bundled first nano-protrusions BNS1. A first height H1 of the first-nano protrusion NS1 may be a distance from the surface 100S of the substrate 100 to one end of the first nano-protrusion NS1. For example, the first height H1 may be approximately 50 nm to approximately 2.2 m. A first pitch between the first nano-protrusions NS1 may be approximately 10 nm to approximately 1.2 m.

Figure 1B:
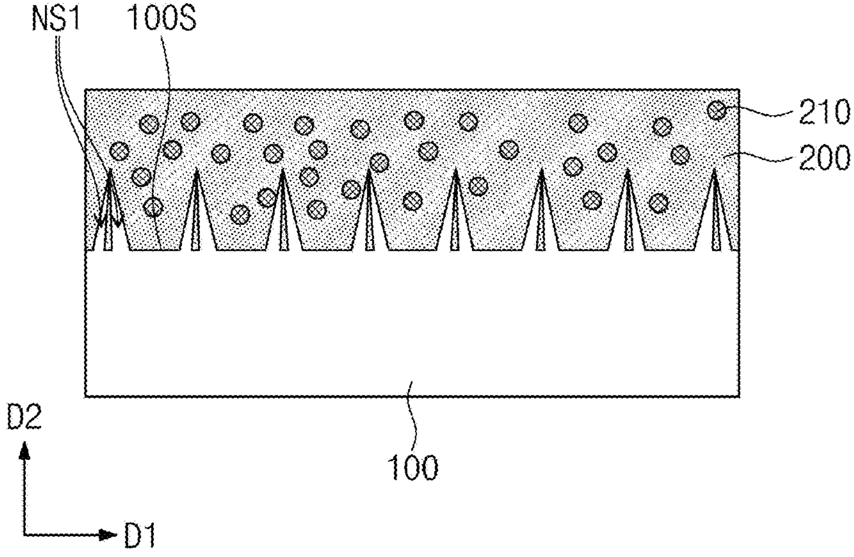

Referring to FIG. 1B, a dopamine solution 200 may be coated on the surface 100S of the substrate 100. The dopamine solution 200 may contain dopamine 210. The dopamine solution 200 may further contain a tris buffer, ethanol, sodium (Na), and water. The dopamine solution 200 may be coated by a method such as dip coating, drip coating, or the like. The coating of the dopamine solution 200 may be performed within 1 second to 1 minute.

Figure 1C:
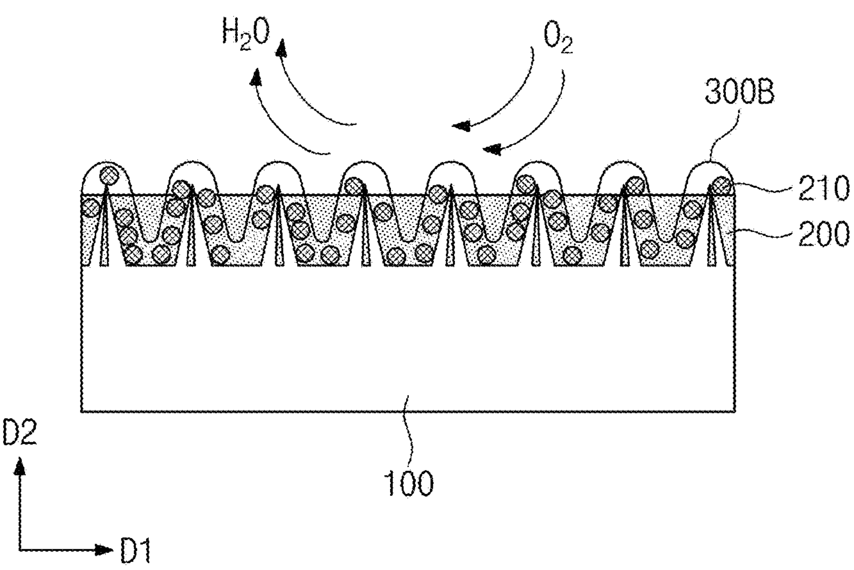

Referring to FIG. 1C, the substrate 100 coated with the dopamine solution 200 may be dried in the air atmosphere. An oxygen ($O_2$) is injected through the interface between air and the dopamine solution 200, and water ($H_2O$) may evaporate. The dopamine 210 in the dopamine solution 200 reacts with oxygen and is polymerized, so that an interface 300B of a polydopamine layer 300 to be formed may be disposed on the first nano-protrusions NS1.

Figure 1D:
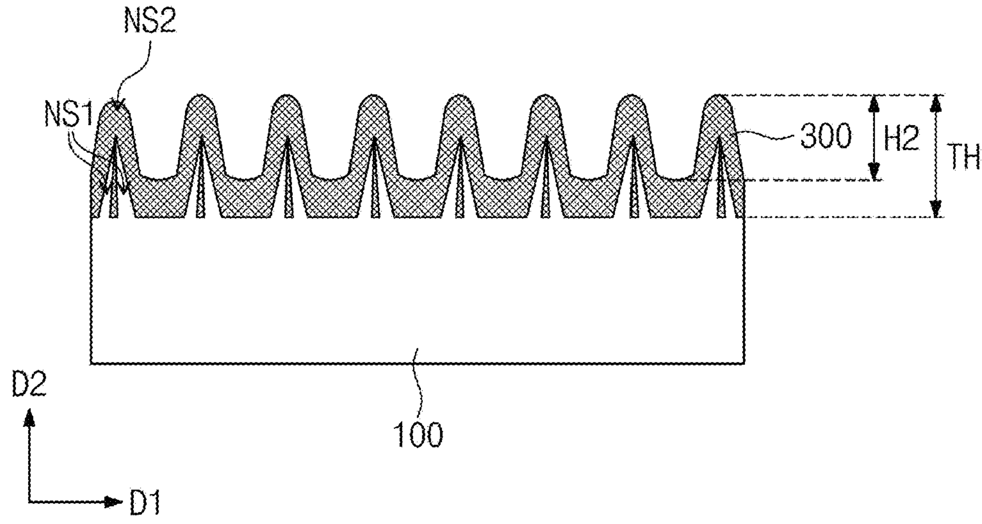

Referring to FIG. 1D, the polydopamine layer 300 including second nano-protrusions NS2 may be formed. Each of the second nano-protrusions NS2 may be formed on the first nano-protrusion NS1 or the bundled first nano-protrusion BNS1. The second nano-protrusion NS2 may overlap the first nano-protrusion NS1 or the bundled first nano-protrusions BS1 in the second direction D2. Each of the second nano-protrusions NS2 may have a second height H2. The second height H2 may be a distance from a level of an upper surface of the polydopamine layer 300 covering the surface 100S of the substrate 100 to a level of one end of the second nano-protrusion NS2. The second height H2 may be less than the first height H1. The second height H2 may be approximately 30 nm to approximately 1.5 m. A second pitch between the second nano-protrusions NS2 may be approximately 10 nm to approximately 1.2 m. The polydopamine layer 300 has the second nano-protrusion NS2 on the surface thereof, and thus, may have a nano-level roughness. As a result, as to be described later, the polydopamine layer 300 may have superhydrophilicity.

A thickness TH of the polydopamine layer 300 may be a distance from the surface 100S of the substrate 100 to the one end of the second nano-protrusion NS2. The thickness of the polydopamine layer 300 may be controlled according to the size (ex: the first height, the first pitch) of the first nano-protrusions NS1. The thickness TH of the polydopamine layer 300 may be greater than 1 nm and less than 10 m. As an example, the thickness TH of the polydopamine layer 300 may be approximately 130 nm.

Figure 2:
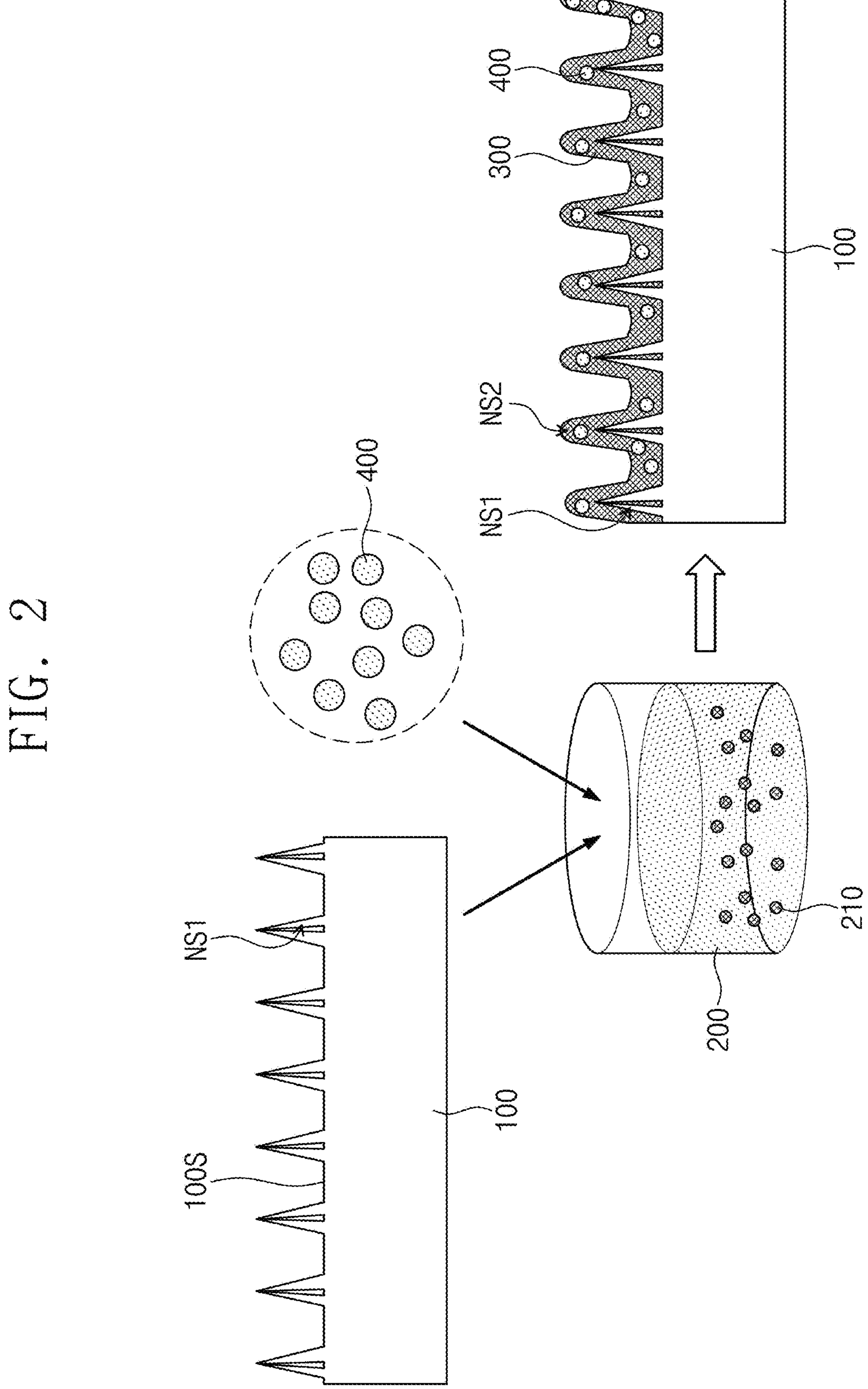
FIG. 2 is a cross-sectional view of a polydopamine composite material according to some embodiments.

FIG. 2 is a conceptual view showing a process of forming a polydopamine composite material according to some embodiments. Except for those to be described below, descriptions are the same as those described with reference to FIG. 1A to FIG. 1D, and thus will be omitted.

Referring to FIG. 2, before coating a dopamine solution 200 on a surface 100S of a plasma-treated substrate 100, functional particles 400 may be added to a dopamine solution 200. The functional particles 400 may include at least one of carbon black, carbon nanotubes, graphene, graphene oxide, metal-organic frameworks, metal particles, or oxide particles.

Thereafter, the dopamine solution 200 containing the functional particles 400 may be coated on the surface 100S of the substrate 100 on which first nano-protrusions NS1 are formed. When the substrate 100 coated with the dopamine solution 200 containing functional particles 400 is polymerized in air, a polydopamine layer 300 containing the functional particles 400 may be finally formed.

Figure 3A:
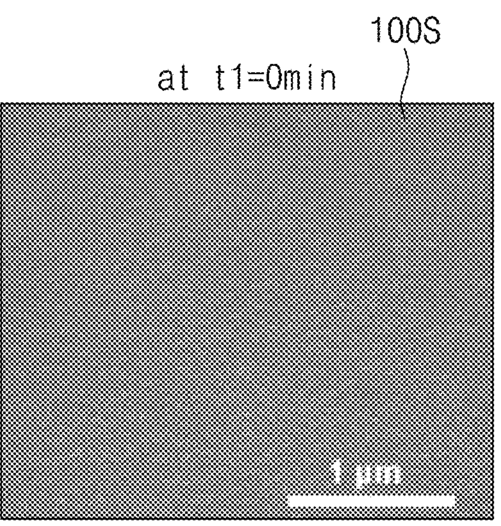
FIG. 3A, FIG. 3B, FIG. 3C, and FIG. 3D are views showing changes in the surface of a substrate according to plasma treatment duration.
Figure 3B:
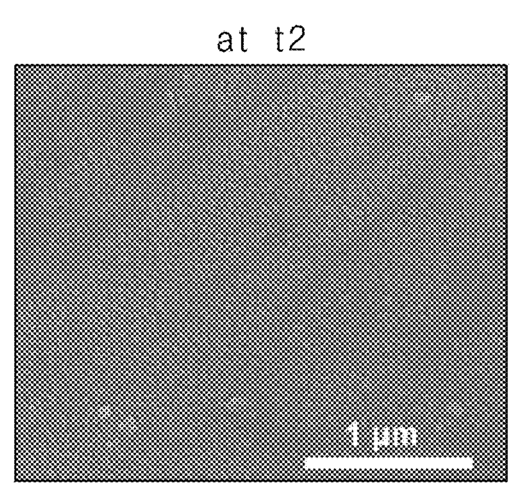
Figure 3C:
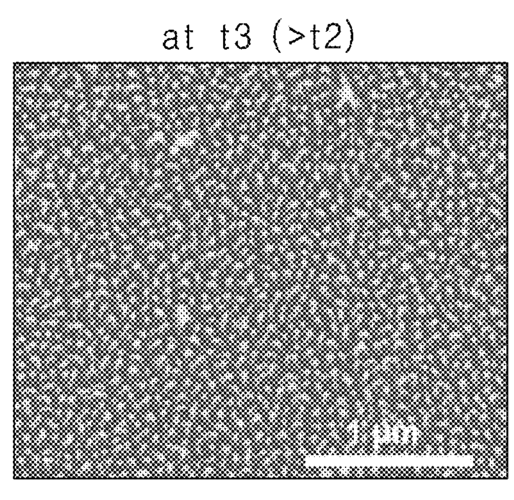
Figure 3D:
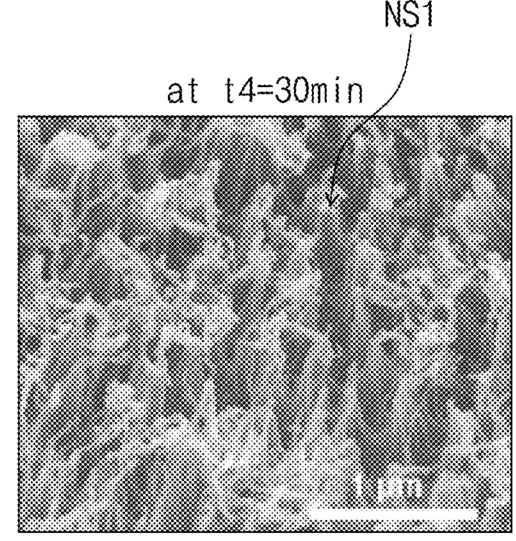

FIG. 3A, FIG. 3B, FIG. 3C, and FIG. 3D are views showing changes in the surface of a substrate according to plasma treatment duration. A PET substrate was used as the substrate, and FIG. 3A shows the surface of the substrate before plasma treatment (t1=0 min), FIG. 3B shows the surface of the substrate after the plasma treatment is performed for the duration of t2 (t2=10 min), FIG. 3C shows the surface of the substrate after the plasma treatment is performed for the duration of t3 (t3=20 min), and FIG. 3D shows the surface of the substrate after the plasma treatment is performed for the duration of t4 (t4=30 min) with a scanning electron microscope (SEM).

Referring to FIG. 3A to FIG. 3D, it can be seen that protrusions are formed on a surface 100S of the substrate according to plasma treatment duration, and first nano-protrusions NS1 are finally formed as shown in FIG. 3D.

FIG. 4A, FIG. 4B, FIG. 4C, and FIG. 4D are views showing the formation of a polydopamine layer on the surface of a plasma-treated substrate.

Specifically, FIG. 4A, FIG. 4B, FIG. 4C, and FIG. 4D are views observed with an SEM after coating the surface of each of the substrates described with reference to FIG. 3A, FIG. 3B, FIG. 3C, and FIG. 3D with a dopamine solution for one second, and polymerizing the same in air.

Figure 4A:
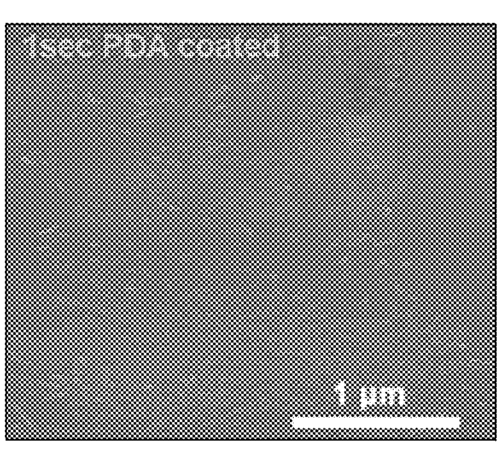
FIG. 4A, FIG. 4B, FIG. 4C, and FIG. 4D are views showing the surface of a polydopamine layer formed on the surface of a plasma-treated substrate.
Figure 4B:
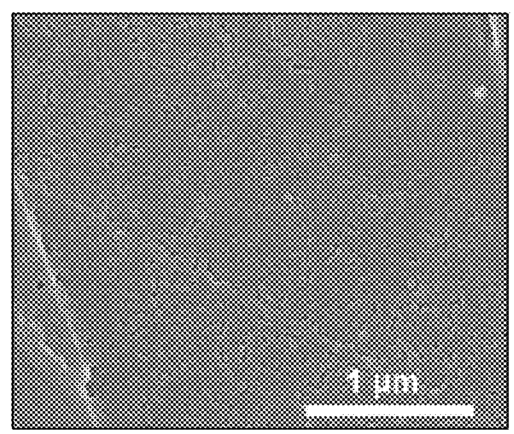
Figure 4C:
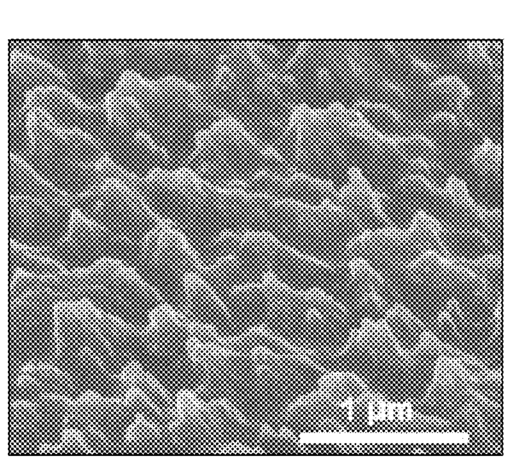
Figure 4D:
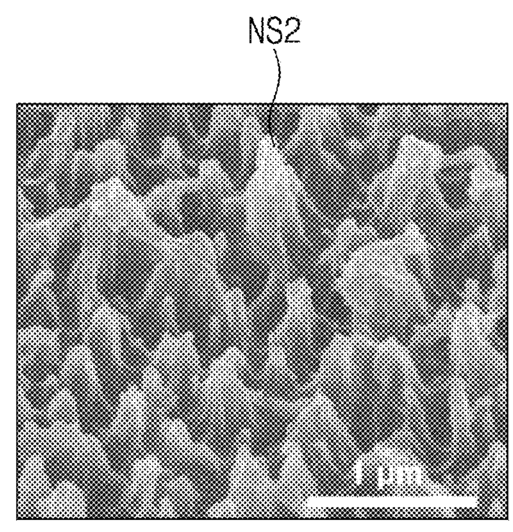

Referring to FIG. 4D, it can be seen that second nano-protrusions NS2 are formed on a polydopamine layer. Referring to FIG. 3A to FIG. 3D and FIG. 4A to FIG. 4D, if nano-protrusions of the surface of a substrate are formed to have a larger aspect ratio, nano-protrusions of a polydopamine layer are also formed to have a larger aspect ratio accordingly.

Figure 5:
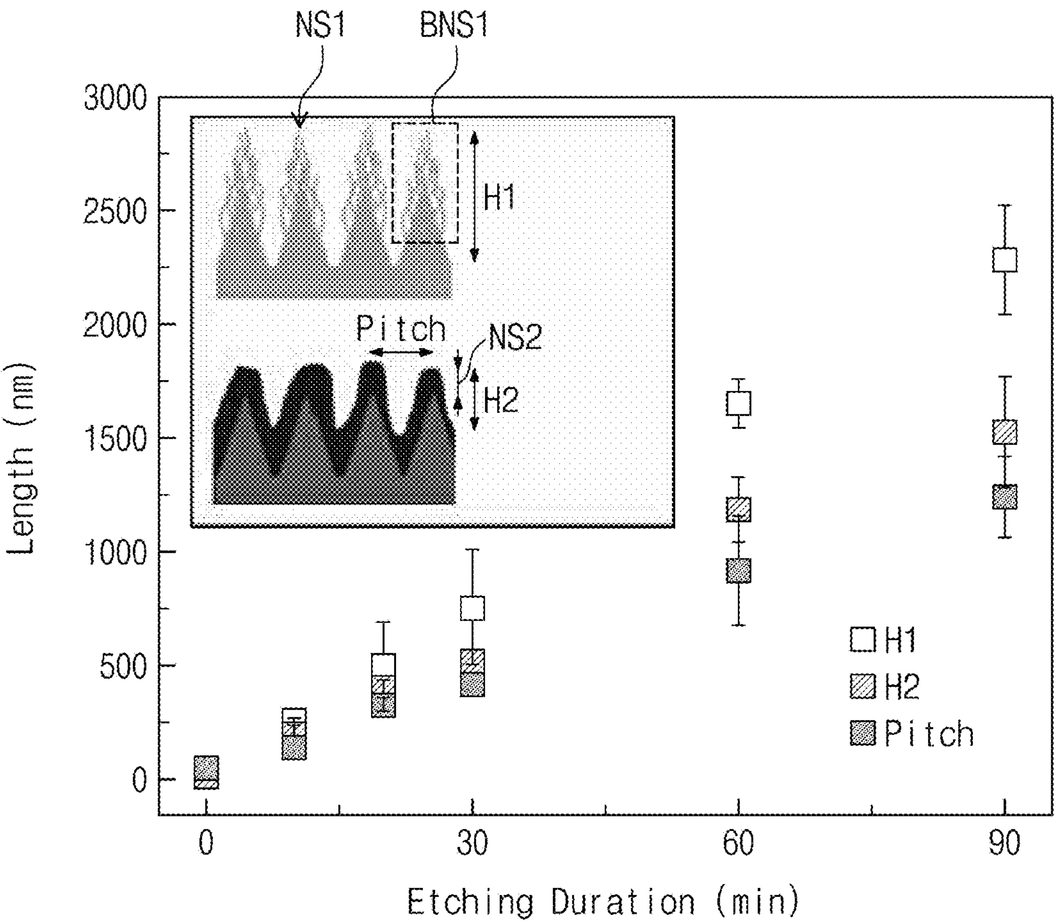
FIG. 5 is a graph showing a first height of a first nano-protrusion, a second height of a second nano-protrusion, and a pitch between the second nano-protrusions on a plasma-treated substrate according to plasma treatment duration.

FIG. 5 is a graph showing a first height of a first nano-protrusion, a second height of a second nano-protrusion, and a pitch between the second nano-protrusions on a plasma-treated substrate according to plasma treatment duration.

Referring to FIG. 5, it has been observed that a first height H1 of a first nano-protrusion NS1 increases as the plasma treatment duration increases. It has been confirmed that a second height H2 of a second nano-protrusion NS2 of a polydopamine layer formed on a first nano-protrusion NS1 varies depending on the height of a first nano-protrusion NS1 before coating a dopamine solution. That is, it can be confirmed that the height of the second nano-projection NS2 increases as the height of the first nano-projection NS1 increases. In addition, it can be confirmed that a pitch between the second nano-projections NS2 also increases as the first height H1 of the first nano-protrusion NS1 increases. That is, it can be seen that the dopamine solution is formed conformally on the first nano-protrusion NS1, and the second nano-protrusion NS2 is formed with a similar surface roughness to that of the first nano-protrusion NS1.

Figure 6A:
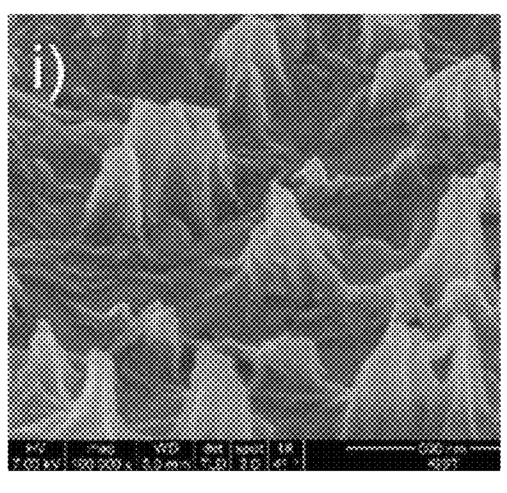
FIG. 6A is a scanning electron microscope (SEM) image of a surface coated with polydopamine on a substrate on which a first nano protrusion is formed.
Figure 6A:
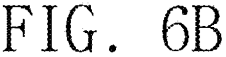
Figure 6B:
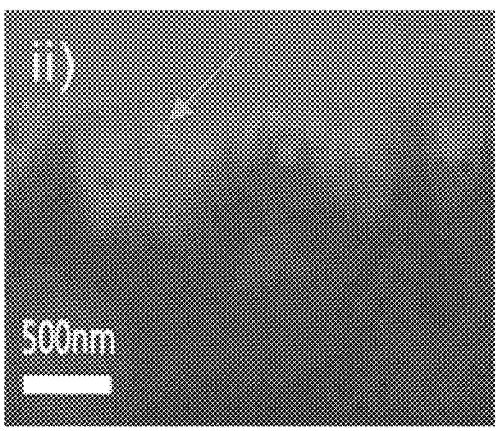
FIG. 6B is a transmission electron microscopy (TEM) image of the cross-section of FIG. 6A.
Figure 6C:
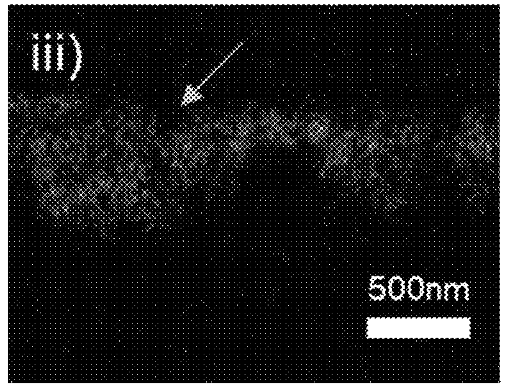
FIG. 6C is a transmission electron microscopy energy dispersive spectrometer (TEM EDS) image of the cross-section of FIG. 6A.

FIG. 6A is a scanning electron microscope (SEM) image of a surface coated with polydopamine on a substrate on which a first nano protrusion is formed. FIG. 6B is a transmission electron microscopy (TEM) image of the cross-section of FIG. 6A. FIG. 6C is a transmission electron microscopy energy dispersive spectrometer (TEM EDS) image of the cross-section of FIG. 6A. Referring to FIG. 6A to FIG. 6C, it can be seen that a polydopamine layer formed on first nano-protrusions fills a gap between the first nano-protrusions, and is formed on the first nano-protrusions to form a second nano-protrusion.

Figure 7:
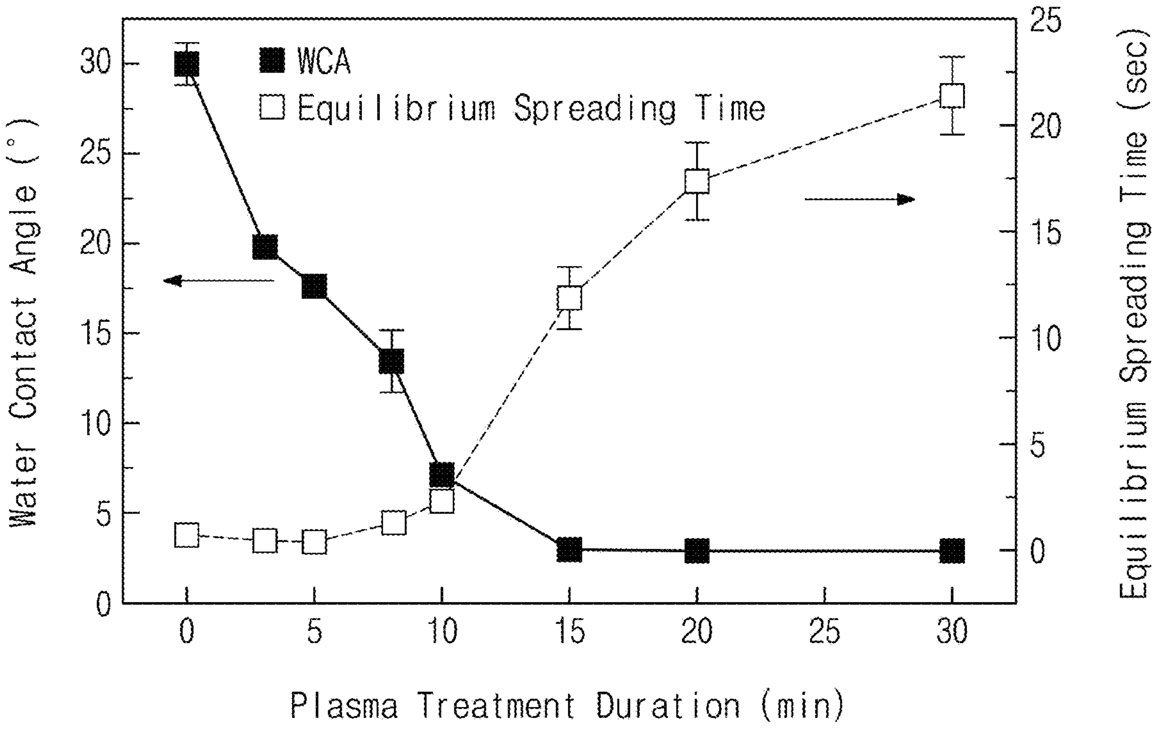
FIG. 7 is a graph showing a change in the water contact angle of a polydopamine layer and a change in the water spreading time according to plasma treatment duration of a surface of a substrate.

FIG. 7 is a graph showing a change in the water contact angle of a polydopamine layer and a change in the water spreading time according to plasma treatment duration of a surface of a substrate.

Referring to FIG. 7, it can be seen that as the plasma treatment duration increases, the water contact angle decreases. In addition, it can be seen that as the plasma treatment duration increases. The equilibrium spreading time of water increases. That is, as the plasma treatment duration increases, the hydrophilicity of the polydopamine layer also increases.

Example 1

Oxygen plasma treatment was performed by plasma etching under vacuum. By injecting an oxygen ($O_2$) gas of 40 sccm at a vacuum degree of 40 mTorr, the plasma treatment was performed on a PET substrate under a power of 50 W and a voltage of 400 V. A tris buffer aqueous solution and ethanol were mixed to form a solution. Thereafter, dopamine and $NaIO_4$ were added thereto and mixed through stirring and the like. The plasma-treated PET substrate was immersed in and then removed from a dopamine solution for approximately 10 seconds. Thereafter, the dopamine was polymerized while the PET substrate was being dried in air.

Example 2

The same procedure as in Example 1 was performed, except that the plasma-treated PET substrate was immersed in and then removed from the dopamine solution for approximately 1 minute in Example 1.

Comparative Example 1

The same procedure as in Example 1 was performed, except that the plasma-treated PET substrate was immersed in and then removed from the dopamine solution for approximately 1 hour in Example 1.

Comparative Example 2

Unlike Example 1, the PET substrate was not subjected to the plasma treatment, and was not coated with the dopamine solution.

Comparative Example 3

Unlike Example 1, the PET substrate was not subjected to the plasma treatment, but was coated with the dopamine solution.

Comparative Example 4

Unlike Example 1, the substrate was subjected to the plasma treatment, but was not coated with the dopamine solution.

Figure 8A:
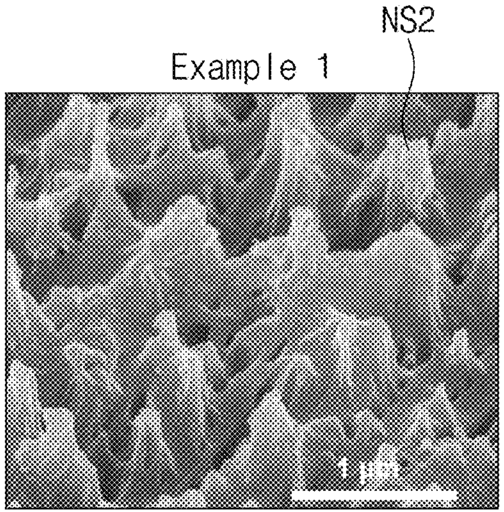
FIG. 8A, FIG. 8B, and FIG. 8C are views showing surfaces of Example 1, Example 2, and Comparative Example 1.
Figure 8B:
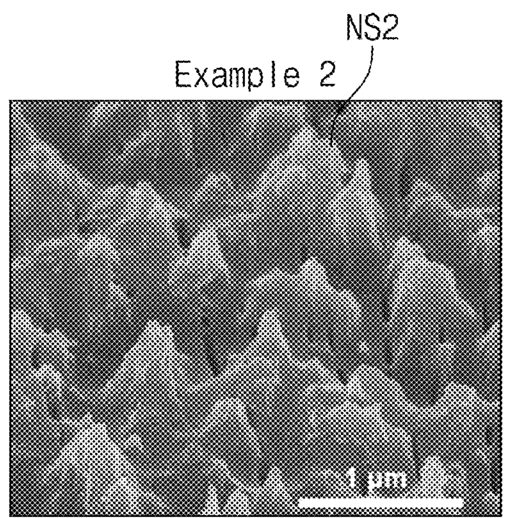
Figure 8C:
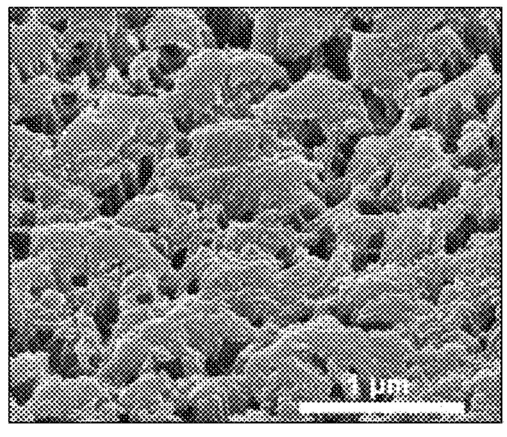

FIG. 8A, FIG. 8B, and FIG. 8C are views showing surfaces of Example 1, Example 2, and Comparative Example 1.

Referring to FIG. 8A and FIG. 8B, it can be confirmed that the second nano-protrusions NS2 having a protruding shape are formed on the polydopamine layer. Referring to FIG. 8C, it has been confirmed that when the coating state is maintained without drying in the dopamine solution for a long period of time, the second nano-protrusions are not formed.

Figure 9:
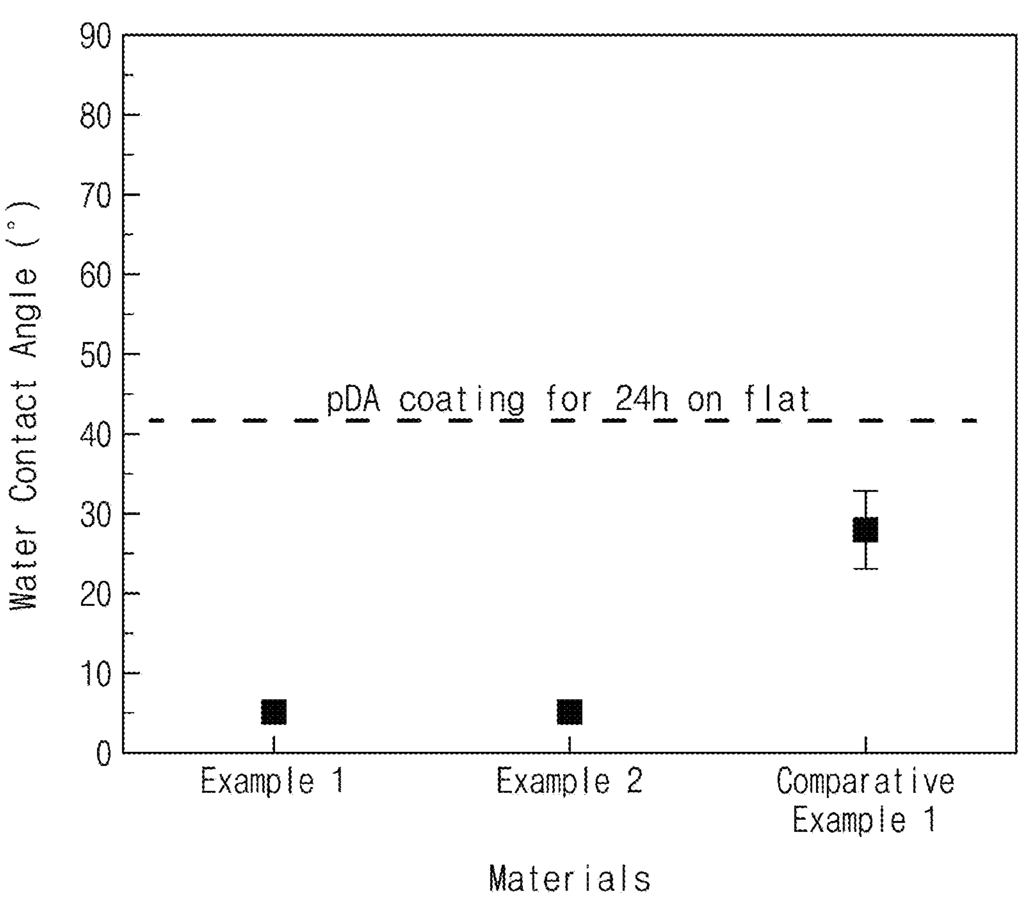
FIG. 9 is a graph showing water contact angles of Example 1, Example 2, and Comparative Example 1.

FIG. 9 is a graph showing water contact angles of Example 1, Example 2, and Comparative Example 1.

Referring to FIG. 9, it has been observed that Example 1 and Example 2 have water contact angles of less than 10 degrees, and thus, have superhydrophilicity, whereas Comparative Example 1 has a water contact angle of greater than 10 degrees, and thus, does not have superhydrophilicity.

Figure 10A:
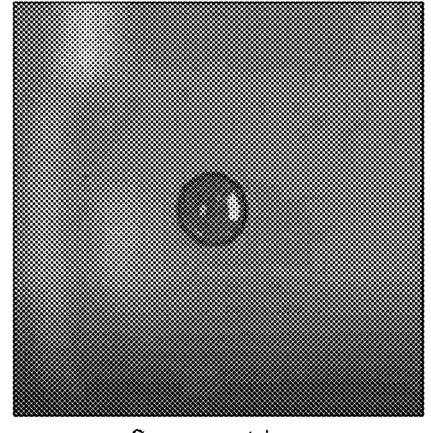
FIG. 10A, FIG. 10B, and FIG. 10C are views showing the degree of spreading after water droplets are dropped on surfaces in Comparative Example 2, Comparative Example 3, and Example 1, respectively.
Figure 10B:
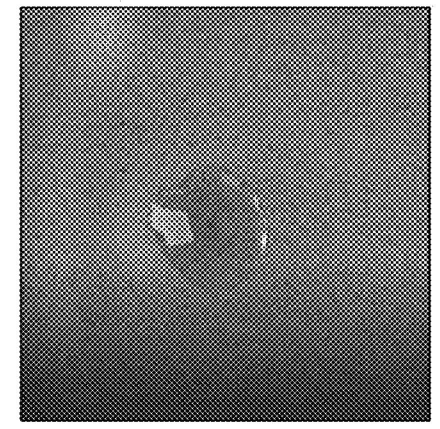
Figure 10C:
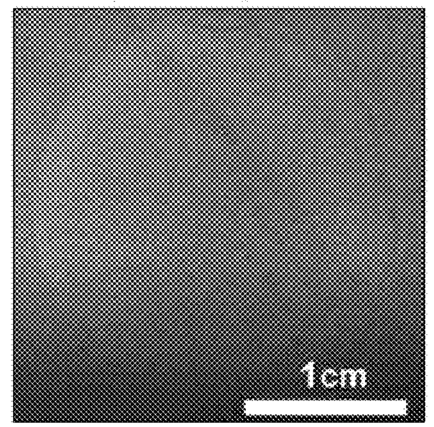

FIG. 10A, FIG. 10B, and FIG. 10C are illustrations showing the degree of spreading after water droplets are dropped on surfaces of polydopamine layers in Comparative Example 2, Comparative Example 3, and Example 1, respectively. Referring to FIG. 10A to FIG. 10C, Example 1 shows that the droplets are more spread out within the same period of time than in Comparative Example 1 and Comparative Example 2. That is, it can be seen that Example 1 has a greater droplet spread distance over time than Comparative Example 1 and Comparative Example 2.

Figure 11:
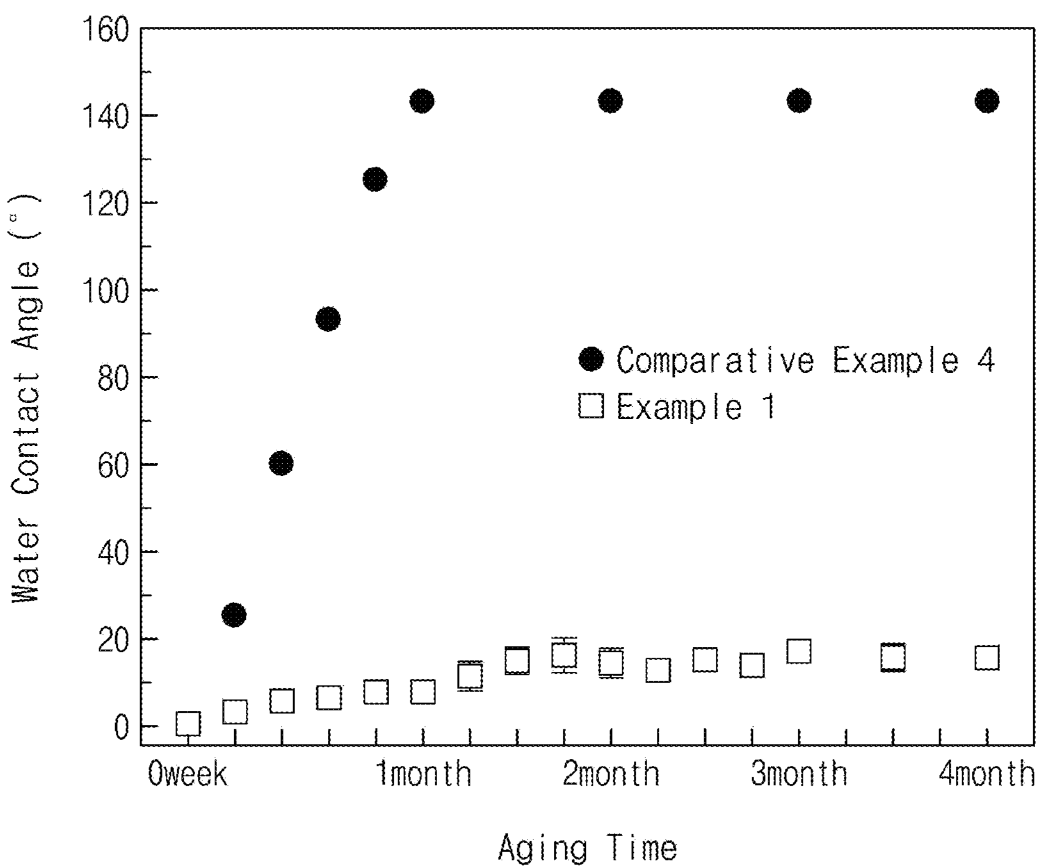
FIG. 11 is a graph showing changes in water contact angle over time in Example 1 and Comparative Example 4.

FIG. 11 is a graph showing changes in water contact angle over time in Example 1 and Comparative Example 4.

Referring to FIG. 11, it has been observed that Example 1 does not lose its superhydrophilicity and hydrophilicity over time. In comparison, it has been observed that Comparative Example 4 loses its hydrophilicity within one month.

Figure 12:
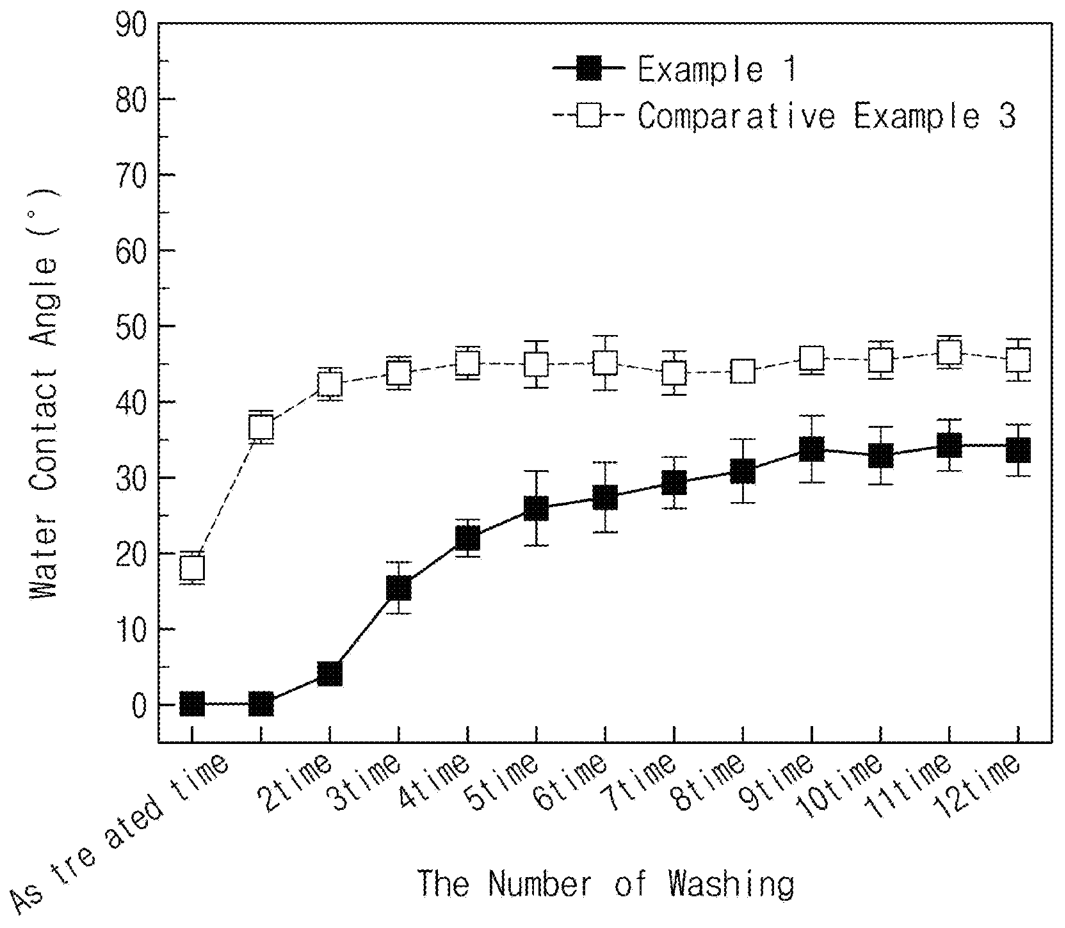
FIG. 12 is a graph showing changes in water contact angle according to the number of times of washing in Example 1 and Comparative Example 3.

FIG. 12 is a graph showing changes in water contact angle according to the number of times of washing in Example 1 and Comparative Example 3.

Comparing Example 1 with Comparative Example 3, it can be seen that if the number of times of washing is increased, Example 1 maintains a smaller water contact angle than Comparative Example 3, and thus, has better durability of hydrophilicity.

TABLE 1

| Thickness of polydopamine layer | |
|---|---|
| Comparative Example 3 | Example 1 |
| <30 nm | >130 nm |

Table 1 shows the thickness of the polydopamine layer of each of Comparative Example 3 and Example 1. Specifically, the thickness of the polydopamine layer of each of Comparative Example 3 and Example 1 was measured with an optical microscope. It has been observed that in Comparative Example 3, the polydopamine layer has a thickness of less than 30 nm, and in Example 1, the polydopamine layer has a thickness of greater than 130 nm (ex: 500 nm).

According to the concept of the present invention, a polydopamine composite material may include a substrate including first nano-protrusions, and may include, on the substrate, a polydopamine layer including second nano-protrusions. The first nano-protrusions may allow the polydopamine layer to have the shape of the second nano-protrusions when forming the polydopamine layer. Since the polydopamine layer includes the second nano-protrusions, the polydopamine layer may have superhydrophilicity, which is beyond the hydrophilicity that a polydopamine material typically has.

A method for manufacturing the polydopamine composite material according to the present invention performs dopamine coating within one minute or less, and thus, may prevent the first nano-protrusions formed on the substrate from being removed, and a dopamine solution may be smeared on the first nano-protrusions. When water of the dopamine solution is evaporated in air from the smeared dopamine solution, dopamine is polymerized, which may form a polydopamine layer. In addition, it may also be easy to increase the thickness of the polydopamine layer by performing the polymerization of dopamine in air under the influence of the first nano-protrusions. That is, it is possible to form a superhydrophilic polydopamine layer with good durability while not having a long coating time, and having a short drying time.

According to the concept of the present invention, a polydopamine composite material may include a substrate, and a polydopamine layer disposed on a substrate of the substrate. The polydopamine layer has first nano-protrusions formed on a surface thereof, and thus may have superhydrophilicity in which a contact angle with water maintains less than 10 degrees. The first nano-protrusions may be formed on the surface of the substrate through plasma treatment, and second nano-protrusions may be formed on the first nano-protrusions through dopamine coating and polymerization of dopamine. The polydopamine layer formed in the above-described manner may be formed thick and may maintain hydrophilicity for a long period of time.

Although the embodiments of the present invention have been described with reference to the accompanying drawings, it will be understood by those who have ordinary skills in the art to which the present invention pertains that the present invention may be embodied in other specific forms without changing the technical spirit or essential features thereof. It is therefore to be understood that the above-described embodiments are illustrative in all aspects and not restrictive.

What is claimed is:

1. A polydopamine composite material comprising:

a substrate having first nano-protrusions formed on a surface thereof; and a polydopamine layer on the surface of the substrate, wherein the polydopamine layer fills gaps between adjacent ones of the first nano-protrusions and includes second nano-protrusions on a surface thereof, wherein the second nano-protrusions protrude in a direction perpendicular to the surface of the substrate, each of the second nano-protrusions being formed on a corresponding one of the first nano-protrusions and overlapping the corresponding one of the first nano-protrusions in the direction perpendicular to the surface of the substrate, wherein each of the second nano-protrusions has a height less than a height of the corresponding one of the first nano-protrusions, and wherein the polydopamine layer has a contact angle with water of less than 10 degrees.

2. The polydopamine composite material of claim 1, wherein the substrate comprises at least one of plastic, silicon (Si), a metal, ceramic, a synthetic fiber, or a natural fiber.

3. The polydopamine composite material of claim 2, wherein the surface of the substrate has any one shape among a planar shape, a curved shape, or a three-dimensional structure shape.

4. The polydopamine composite material of claim 1, wherein the first nano-protrusions have the shape of a nano-pillar, a nano-hair, a nano-fiber, or a combination thereof.

5. The polydopamine composite material of claim 1, wherein:

the height of each of the first nano-protrusions is approximately 50 nm to approximately 2.2 μm; and a pitch between the first nano-protrusions is approximately 10 nm to approximately 1.2 μm.

6. The polydopamine composite material of claim 1, wherein:

the height of each of the second nano-protrusions is approximately 30 nm to approximately 1.5 μm; and a pitch between the second nano-protrusions is approximately 10 nm to approximately 1.2 μm.

7. The polydopamine composite material of claim 1, further comprising functional particles disposed in the polydopamine layer, wherein the functional particles include at least one of carbon black, carbon nanotubes, graphene, graphene oxide, metal-organic frameworks, metal particles, or oxide particles.

8. The polydopamine composite material of claim 1, wherein a thickness of the polydopamine layer is greater than approximately 1 nm to less than approximately 10 μm.

9. The polydopamine composite material of claim 8, wherein a thickness of the polydopamine layer is greater than approximately 130 nm.

10. The polydopamine composite material of claim 1, wherein the polydopamine layer is conformally formed on the first nano-protrusions.

11. The polydopamine composite material of claim 10, wherein the surface of the substrate has a planar shape.

12. The polydopamine composite material of claim 10, wherein the polydopamine layer further includes functional particles disposed therein.

13. The polydopamine composite material of claim 12, wherein the functional particles include at least one of carbon black, carbon nanotubes, graphene, graphene oxide, metal-organic frameworks, metal particles, or oxide particles.

14. A method for manufacturing a polydopamine composite material, the method comprising:

preparing a substrate;

forming first nano-protrusions on a surface of the substrate;

coating a dopamine solution on the surface of the substrate on which the first nano-protrusions are formed for 1 second to 1 minute; and polymerizing the dopamine solution in air, wherein the polymerizing of the dopamine solution in air forms a polydopamine layer conformally on the first nano-protrusions, wherein the polydopamine layer fills gaps between adjacent ones of the first nano-protrusions and includes second nano-protrusions on a surface thereof, wherein the second nano-protrusions protrude in a direction perpendicular to the surface of the substrate, each of the second nano-protrusions being formed on a corresponding one of the first nano-protrusions and overlapping the corresponding one of the first nano-protrusions in the direction perpendicular to the surface of the substrate, wherein each of the second nano-protrusions has a height less than a height of the corresponding one of the first nano-protrusions, and wherein the polydopamine layer has a contact angle with water of less than 10 degrees.

15. The method of claim 14, wherein the forming of the nano-protrusions comprises performing plasma treatment, wherein the performing of the plasma treatment includes providing at least one of $O_2$, $CF_4$, $SF_6$, Ar, $N_2$, $H_2$, or a mixture gas thereof on the surface of the substrate.

16. The method of claim 15, wherein the performing of the plasma treatment comprises performing a reaction between plasma and the surface of the substrate within approximately 1 to approximately 90 minutes.

17. The method of claim 14, wherein the coating of the dopamine solution is performed within approximately 1 second to approximately 1 minute.

18. The method of claim 14, wherein the forming of the first nano-protrusions comprises a laser beam process, ion beam process, lithography process, or acid etching process.

19. The method of claim 17, further comprising adding functional particles to the dopamine solution, before coating the dopamine solution on the surface of the substrate.

20. The method of claim 19, wherein the functional particles include at least one of carbon black, carbon nanotubes, graphene, graphene oxide, metal-organic frameworks, metal particles, or oxide particles.

* * * * *